United States Patent
Cattaneo et al.

(10) Patent No.: US 7,310,890 B2
(45) Date of Patent: Dec. 25, 2007

(54) APPARATUS FOR AUTOMATICALLY MEASURING EXTERNAL AND INTERNAL PROFILE OF A PIPE AT THE END THEREOF

(75) Inventors: Filippo Cattaneo, Milan (IT); Andrea Franchi, Villanterio (IT); Angelo Longhi, Bagnatica (IT); Alessandro Maffioletti, Dalmine (IT); Luca Montelatici, Milan (IT)

(73) Assignee: Tenaris Connections AG (LI)

( * ) Notice: Subject to any disclaimer, the term of this patent is extended or adjusted under 35 U.S.C. 154(b) by 70 days.

(21) Appl. No.: 10/572,177

(22) PCT Filed: Sep. 27, 2004

(86) PCT No.: PCT/IT2004/000527

§ 371 (c)(1),
(2), (4) Date: Mar. 16, 2006

(87) PCT Pub. No.: WO2005/031249

PCT Pub. Date: Apr. 7, 2005

(65) Prior Publication Data

US 2007/0119066 A1    May 31, 2007

(30) Foreign Application Priority Data

Sep. 29, 2003  (IT) .......................... MI2003A1860

(51) Int. Cl.
*G01B 3/00* (2006.01)
(52) U.S. Cl. .......................................... 33/543; 33/550
(58) Field of Classification Search ................. 33/543, 33/550
See application file for complete search history.

(56) References Cited

U.S. PATENT DOCUMENTS

| | | | | |
|---|---|---|---|---|
| 1,356,214 A * | 10/1920 | Metzger | ...................... | 33/543 |
| 2,587,774 A | 3/1952 | Shack et al. | | |
| 3,913,234 A * | 10/1975 | Windle | ......................... | 33/803 |
| 4,137,641 A * | 2/1979 | Lauri | ........................... | 33/551 |
| 4,803,783 A * | 2/1989 | Tiegs et al. | ................... | 33/557 |
| 5,155,919 A * | 10/1992 | Thomas | ....................... | 33/543 |
| 6,041,512 A * | 3/2000 | Wacke | ......................... | 33/522 |
| 6,286,223 B1 * | 9/2001 | Iwamoto | .................... | 33/555.1 |
| 6,289,600 B1 | 9/2001 | Watts | | |
| 6,357,129 B1 * | 3/2002 | Gray et al. | ................... | 33/550 |
| 6,901,676 B1 * | 6/2005 | Macke | ........................ | 33/550 |
| 6,954,991 B2 * | 10/2005 | Akatsuka et al. | ............. | 33/550 |
| 7,086,169 B1 * | 8/2006 | Bayham et al. | ............... | 33/550 |
| 2002/0056204 A1 * | 5/2002 | Corghi | ........................ | 33/550 |

OTHER PUBLICATIONS

Patent Abstracts of Japan. vol. 017, No. 699 (P-1665) Dec. 21, 1993 and JP 05 240621 A; Sep. 17, 199.

Patent Abstracts of Japan vol. 017, No. 699 (P-1665) Dec. 21, 1993 and JP 05 240620 A, Sep. 17, 1993.

* cited by examiner

Primary Examiner—Christopher W Fulton
(74) Attorney, Agent, or Firm—Lucas & Mercanti, LLP

(57) ABSTRACT

An apparatus for automatically measuring the internal and external profile of pipes (1) at the ends thereof is described, wherein sensors (11a, 11b) measure for each angle of rotation of their support (10) the distance of the corresponding profile, there being provided means for regulating in height the axis of rotation of said support, which is rotatably mounted on a slide (13) slidable in a direction parallel to the axis (X-X) of the pipe to be measured. The measuring system also comprises the processing of the detected data in order to attribute a classification code to the end of the measured pipe.

11 Claims, 4 Drawing Sheets

APPARATUS FOR AUTOMATICALLY MEASURING EXTERNAL AND INTERNAL PROFILE OF A PIPE AT THE END THEREOF

This patent application claims the benefit of priority from Italian Patent Application No. MI2003A 001860 filed Sep. 29, 2003 through PCT Application Ser. No. PCT/IT2004/000527 filed Sep. 27, 2004, the contents of which are incorporated herein by reference.

The present invention relates to an apparatus for automatically measuring the external and internal profile of pipes, in particular of steel pipes, in correspondence of the end thereof.

It is known that with regard to the production of the part of steel pipes that are intended for building pipings or pipelines, such as the ones for transport of fluids, the allowable tolerance for the profile, in correspondence of the ends, should be as low as possible in order to avoid possible significant differences in the geometry of the ends which have to be welded together. However, since these tolerances cannot be zero, the checking thereof is normally carried out by manually measuring the pipes at the end of the manufacturing and finishing process thereof, for example by means of gauges or templates. Optionally, said measures are repeated on site, before the pipe installation, in order to improve the sequence of the single pipes to be welded by combining together ends having internal and external diameter of similar size, so as to minimize the geometrical unevenness in the welded area. Obviously, manual measures cannot be as precise as desirable and involve a remarkable waste of time and manual work, especially since they have to be repeated many times at different diameters of the pipe in order to better reproduce the shape of the internal and external profile along the whole end circumference.

On the other hand, giving up repeated measures in different areas of the circumference causes a less faithful determination of the real shape of the profile, so that the tolerance parameters of the internal and external diameter, of the ovality and thickness variation, measured only in few points at the end of the pipe, result in imperfect couplings with consequent defective weldings of pipes whose parameters have been also measured at few discrete points, for which therefore the calculated average values cannot reflect the real shape of the profile.

Therefore, object of the present invention is providing an apparatus for automatically measuring the internal and external profile in correspondence of the ends of a pipe, so as to precisely determine the variation of said profiles in a continuous way instead of at discrete points, by means of sensors or distance gauges respectively positioned inside and outside the pipe and rotating around the circumference thereof while the pipe is kept still. The measured values obtained for said profiles, expressed in polar coordinates with respect to the center of rotation of the sensors, are referred to the pipe center (or to the point that best approximates it, since a pipe is not perfectly circular) by means of a coordinate transformation, and processed in order to obtain the diameter, ovality and thickness eccentricity average values, so as to associate to each pipe end significant values of the above mentioned parameters suitable for allowing the preparation of a classification of the pipes and in particular of the ends thereof.

Based on this classification, the improvement of the couplings, that is of the sequence in which the ends have to be welded together, can be obtained in an easier way. Also, the feedback response at the finishing line of the pipes can be obtained in real time, thus avoiding excessive deviations from the average values of a manufacturing series, through the intervetion of rounding off operations at the ends, carried out, as known, by shaving removal or cold plastic deformation.

These and further objects are achieved by means of an automatic measuring apparatus whose main features are specified in the first claim, whereas other features are specified in the dependent claims.

An apparent advantage of the apparatus according to the present invention and of the corresponding measuring method consists in that the above mentioned measurements can be carried out in a more accurate and quick way, in a shorter time and with a lower amount of manual work, thus enabling the attribution of a particular "class" of parameters to the ends of each pipe, immediately after the production thereof or by developing, by means of a suitable software, algorithms for optimization of the coupling of the pipe ends to be welded together, also considering the reciprocal angular positions. In this way, it will be possible to subsequently manage more easily the coupling of the pipe ends for the welding at the installation site. It is also possible to directly intervene on the production with feedback systems in order to reduce the deviations from an average value of the profile.

Further advantages and features of the apparatus according to the present invention and of the corresponding measuring method will appear to those skilled in the art from the following detailed description of one preferred embodiment thereof, with reference to the accompanying drawings, wherein.

Figure 1:
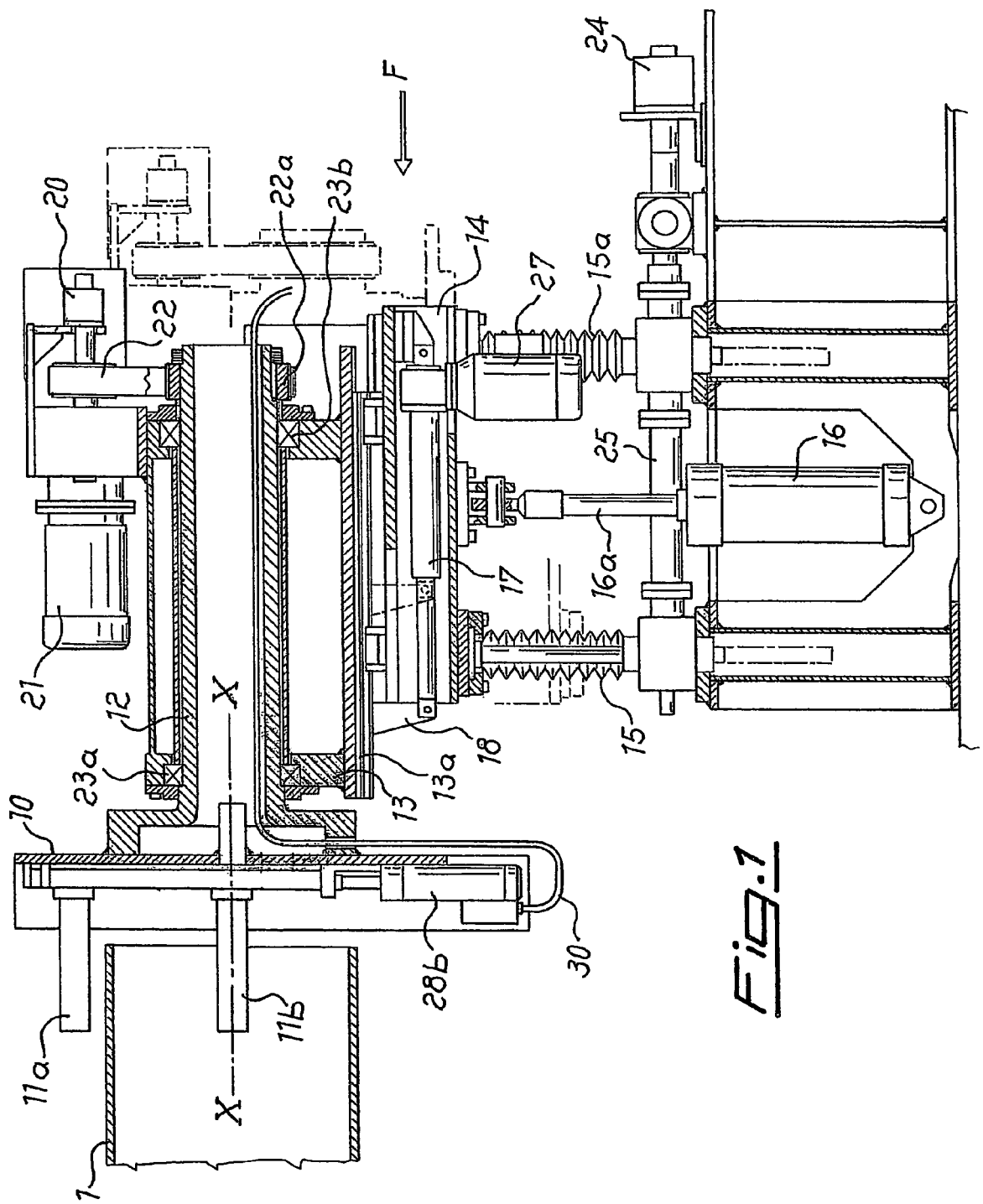
FIG. 1 shows a lateral view, partially in cross-section, of the apparatus according to the invention, some parts of which are shown in broken line at a different position with respect to the operative one, shown in a continuous line.

With reference to the figures, the apparatus for automatically measuring according to the present invention substantially comprises a board 10 supporting measuring sensors 11a and 11b, respectively for the external and internal profile, that is mounted rotatably around a horizontal axis which during the measure should as far as possible be parallel to and approach the longitudinal axis X-X (theoretical, due to the asimmetries) of the pipe whose end has to be measured. To this purpose, pipe 1 is carried with the end to be measured into the measuring station, joined with its end against board 10 while this is in a retracted position in order to avoid interferences, being transported over rollers which form a support of the pipe at a fixed level. However, since the pipe rests on said support (not shown in the drawings) with its lower generatrix, but can obviously have various diameters, it is necessary to align the axes at a same level, besides having the possibility to move horizontally the rotation axis of the board 10, as it will be explained in the following.

A further crucial member of the apparatus is an impulse generator or "encoder" 20 which detects the angular position of the rotating board 10, driven by means of a motoreducer 21, in correspondence of each value determined for both the internal and external profiles by means of sensors 11a and 11b, which are preferably of laser type and in a number of at least one for each profile. The data provided by the sensors and by encoder 20 are then supplied to a data processing system which monitors the measures in correspondence of each angle value, optionally calculates the average thereof and attributes to the end of the pipe which has been measured an identifying code, based on the evaluated parameters, which allows its classification for the purpose of a suitable subsequent coupling with one end of a pipe belonging to the same class, according to prefixed compatibility ranges.

Figure 2:
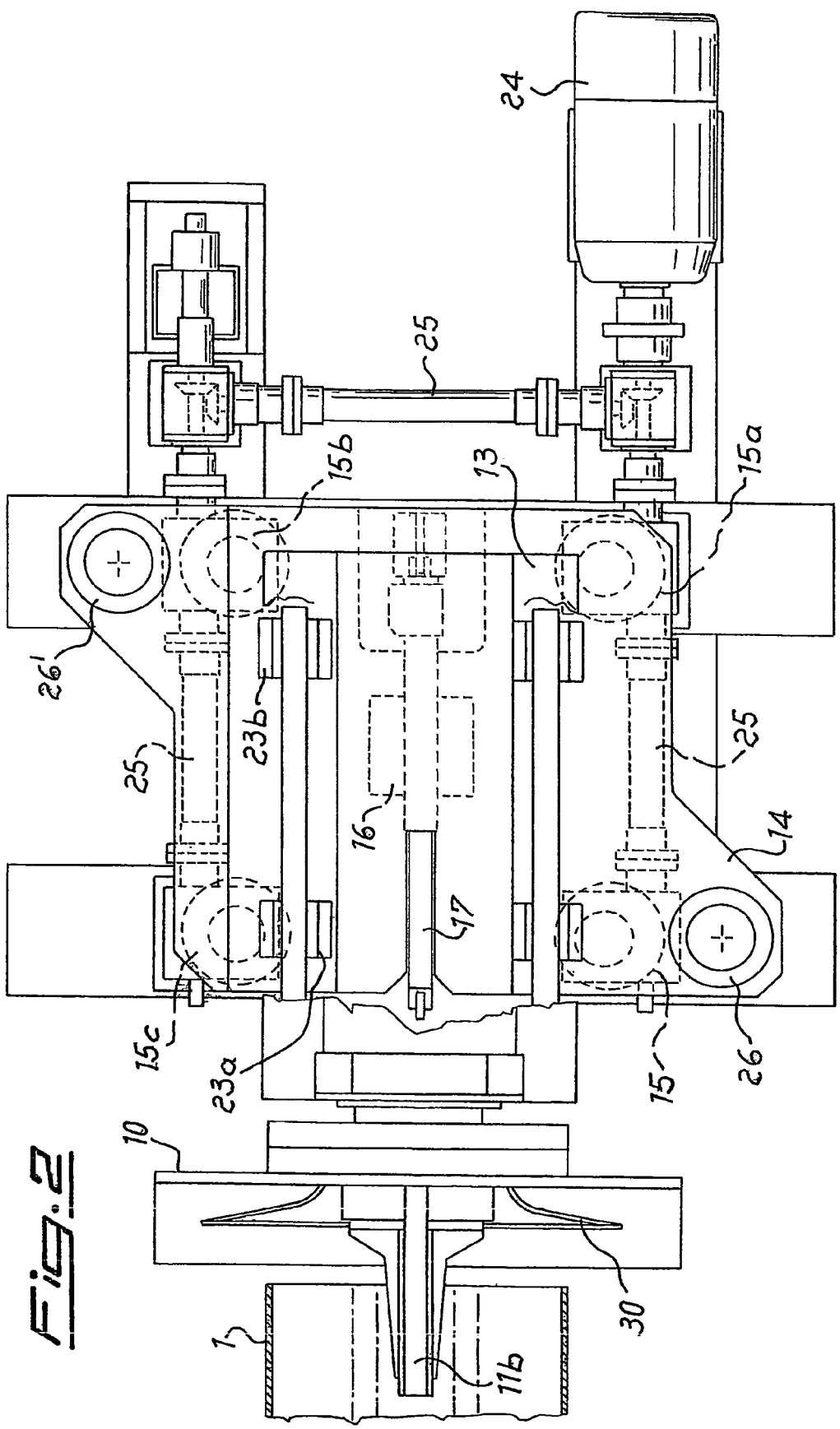
FIG. 2 shows a plan view of the apparatus of FIG. 1.
Figure 3:
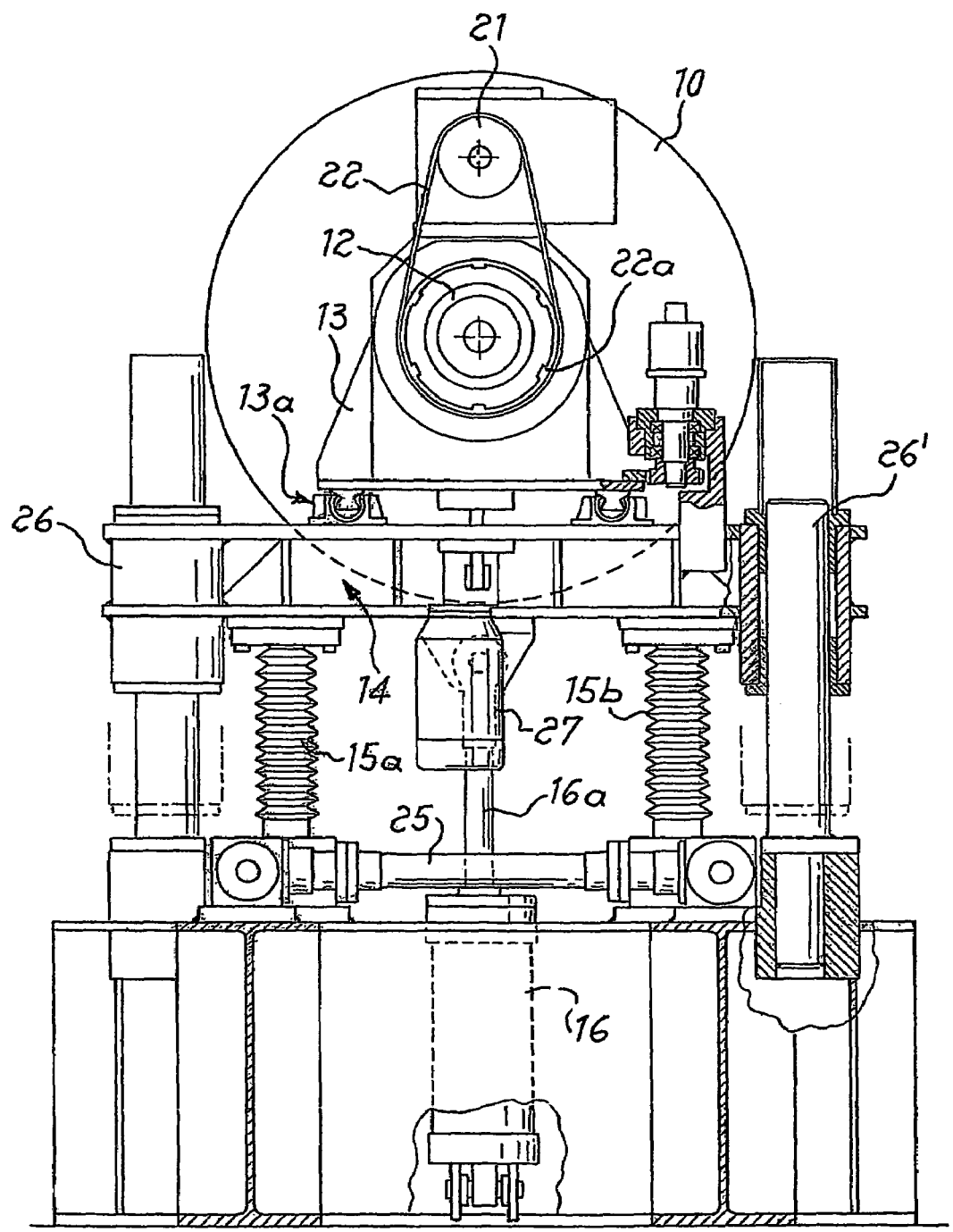
FIG. 3 shows an elevation view of the same apparatus, taken in the direction of arrow F of FIG. 1.

More in detail, with reference to FIGS. 1 and 2, there is shown that said rotatable board 10 is driven by a motoreducer 21 by means of a belt or other transmission means 22, which draws into rotation, through a pulley 22a, a sleeve or a hollow spindle 12 integral with said support board 10, which preferably has round shape. Said sleeve 12 is mounted, through bearings 23a and 23b, on a support 13 which is vertically movable and horizontally slidable as explained in the following. As a matter of fact, said support consists of a slide which is mounted slidably on guides 13a (FIG. 3) integral with a rectangular platform 14, being mounted at the four corners of the support, as it is better shown in FIG. 2, at the upper end of four electromechanical jacks 15, 15a, 15b, 15c controlled by a motoreducer 24 by means of several angular drive transmissions 25 formed of conical gears. The horizontal position of platform 13 is ensured by means of two guiding columns 26, 26', better shown in FIG. 3, in correspondence of two opposite corners of the platform, externally to the jacks (15, 15b), at the ends of a diagonal thereof at the center of which said platform is mounted at the top of piston 16a of a pneumatical cylinder 16 for backlash compensation and suitable for blocking the platform at the level determined by the screw jacks. Obviously, also support 13 and the axis of sleeve 12 are blocked in such a position that corresponds to the alignment of said axis, which is the same of rotation of board 10, with a further axis, parallel and near to axis X-X of pipe 1 to be measured (as already mentioned).

It is to be noted that said positioning in height, which has to be changed only when a new series of pipes having a different diameter from the previous one has to be measured, is carried out with the supporting slide 13 withdrawn with respect the final measuring position, for example of 200 mm, in order to avoid that the following vertical movements of the measuring sensors 11a and 11b may interfere with the already positioned pipe 1. Only afterwards, once the prefixed height has been reached together with the substantial alignment of the rotation axis of the measuring device with the theoretical X-X axis of the pipe, a horizontal electromechanical jack 17, preferably a ball screw jack with zero play guide, is driven by means of a motor 27, in order to move forward slide 13 along guides 13a provided on platform 14 and to bring board 10 next the end of pipe 1 to be measured, with the sensors 11a and 11b being respectively inside and outside the pipe. FIG. 1 shows in a continuous line the final measuring position and in broken lines some parts of the apparatus, on the right side of the drawing, in the withdrawn and lowered starting position as already explained, with connecting brackets 18 (only one shown) between jack 17 and slide 13, whereas for the sake of clarity of the drawing other parts have been shown only in the lowered position. Said jack 27 may be advantageously housed inside platform 14, which is suitably formed of two parallel plates at a distance from each other.

Figure 4:
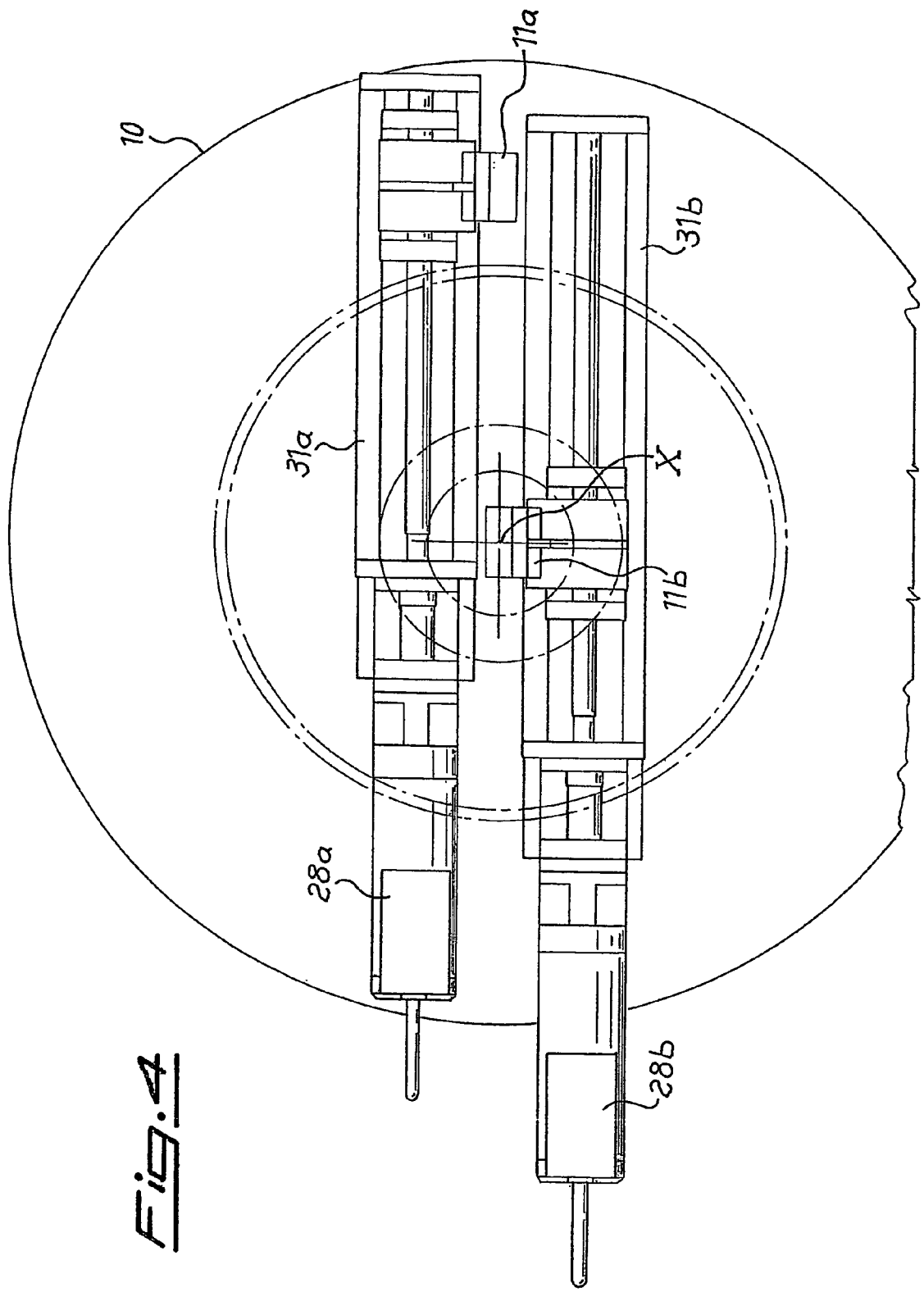
FIG. 4 shows a partial view of said apparatus from the opposite side with respect to the representation of FIG. 3, limited to a fragmentarily and schematic view of the rotating support board for the measuring sensors.

With reference to FIG. 4, there is shown in particular the mounting regulation device for the sensors 11a and 11b on the rotating support board 10. Said measuring sensors are slidably mounted on corresponding parallel guides 31a and 31b in such a way as to be both radially movable along a diameter of the rotating board 10, each being driven by and independent motor, for example electric with direct current, 28a and 28b. The respective guides of the slides 31a and 31b are also preferably of the ball screw kind with backlash compensation. It is to be noted that, again in order to avoid interferences of the sensors 11a and 11b with the profile of the pipe to be measured, it is preferable to adopt as initial positions of the sensors, before the regulation thereof in radial direction for taking them at the optimal measuring distances respectively from the external and internal profile, those positions corresponding to safety positioning even in the extreme geometric conditions of the pipe. More precisely, it is preferable to have the internal sensor (or the internal sensors) 11b next to the X-X axis at the center of board 10, so as to certainly avoid inteferences even in the critical conditions of minimum diameter and maximum thickness of the pipe, whereas the external sensor (or the external sensors) 11a will be positioned in the area of the periphery of board 10, thus excluding any possible interference with pipes having the maximum possible diameter. From these initial positions, after having moved forward the apparatus in the measuring position as previously explained, with the sensors bridging the profile of the pipe, in safety conditions, by starting independently the two motors 28a and 28b, said sensors, for example triangulation laser sensors, are carried at the required distances, respectively from the internal and external profile, so that the measuring cycle can start. It is to be noted that previously and periodically, in the course of a series of measures, a gauged pin having a perfectly known profile can be introduced instead of a pipe to be measured, so that the sensors can be brought to their exact calibration distances, in order to obtain precisely the variation of distances in case of imperfectly circular form of the profile to be measured.

It is to be noted that spindle 12 integral with the support board 10 of the sensors is hollow in the middle like a sleeve for the passage, as shown in FIG. 1, of the electric cables 30 necessary both for driving motors 28a and 28b, and for electrical supply of the sensors, preferable but not necessarily of laser type, as well as for conveying the measured values taken together with the corresponding polar coordinates indicated by encoder 20 towards the data processing system (not shown). This is intended for generating a classification code, based for example on the average of the measured values, and optionally for sending the suitable feedback commands to the last manufacturing steps of the pipes, or for developing, by means of a dedicated software, algorithms capable of directly managing the optimized coupling, also angularly, of the ends to be welded together.

The invention claimed is:

1. An apparatus for measuring the internal and external profile of metal pipes at the ends thereof, comprising at least a pair of sensors (11a, 11b) suitable for measuring the distance from the external and from the internal profile respectively of the pipe (1) kept in a fixed position, with said sensors mounted on a support (10) orthogonal to the theoretical axis (X-X) of the pipe (1) and rotatable around its axis of rotation, there being provided means for carrying vertically said axis of rotation next to said axis (X-X) and means suitable for recording the measure data taken for each polar coordinate relevant to the instantaneous angular position of said sensors (11a, 11b) during the rotation of said support (10) driven by motor means (21), in correspondence of means (20) suitable for detecting said angular position, characterized in that said support (10) of the sensors (11a, 11b) is mounted at the end of an internally hollow spindle or sleeve (12) which is driven at the opposite end by means (21, 22, 22a) in order to be drawn into rotation with respect to a slide member (13) vertically movable for changing the height of the axis of rotation thereof and slidable in a direction parallel to said axis.

2. An apparatus according to claim 1, characterized in that said sensors (11a, 11b) are radially movable on said support (10) in order to regulate their distance from the center of the support itself and therefore from said axis (X-X) of the pipe (1) as a function of the size of diameter and thickness of the pipe itself.

3. An apparatus according to claim 2, characterized in that said sensors (11a, 11b) are slidably mounted along slides (31a, 31b) integral with said board (10), having a round shape, substantially parallel to a diameter thereof, and are driven by means of respectively independent motors (28a, 28b) so as to slide in correspondence of the diameter to which said slides are parallel between a position coincident with axis (X-X) for the internal sensors (11b) and a peripheric position for the external sensors (11a) at a distance from said axis which is higher than the radius of the external profile for the pipe having the maximum diameter which is to be measured.

4. An apparatus according to claim 2, characterized in that said slide (13) is supported on a platform (14) with respect to which it is slidable in a direction parallel to the axis of rotation thereof, along guides (13a) integral with said platform (14).

5. An apparatus according to claim 1, characterized in that said slide (13) is supported on a platform (14) with respect to which it is slidable in a direction parallel to the axis of rotation thereof, along guides (13a) integral with said platform (14).

6. An apparatus according to claim 5, characterized in that said platform (14) supporting the slide (13) is vertically movable being mounted at the top of four mechanical jacks (15, 15a, 15b, 15c) at the four corners of the substantially rectangular shape thereof, said jacks being driven by a single motor (24) by means of angular drive transmission gears (25).

7. An apparatus according to claim 6, characterized in that two guiding columns (26, 26a) are provided at two opposite corners at the ends of an ideal diagonal, at the center of which said platform is mounted at the top of the piston (16a) of a pneumatic cylinder (16) suitable for ensuring the maintenance of the achieved vertical position.

8. An apparatus according to claim 5, characterized in that two guiding columns (26, 26a) are provided at two opposite corners at the ends of an ideal diagonal, at the center of which said platform is mounted at the top of the piston (16a) of a pneumatic cylinder (16) suitable for ensuring the maintenance of the achieved vertical position.

9. An apparatus according to claim 1, characterized in that said slide (13) is driven, for its horizontal sliding, by means of an electromechanical jack (17) mounted with the driving member thereof (27) on said platform (14) and integral with the slide (13) by means of brackets (18).

10. An apparatus according to claim 1, characterized in that said jacks for the vertical movement (15, 15a, 15b, 15c) and horizontal movement (17) of the rotation axis of said support (10) as well as the distance regulation members (28a, 28b) of the two sensors (11a, 11b) along a diameter of the support are ball screw jacks with backlash compensation.

11. An apparatus according to claim 1, characterized in that inside the hollow spindle or sleeve (12) are passing the cables and the conduits for supplying said sensors (11a, 11b) and said respective regulation motors, as well as for transmitting the detected measures to a data processing system, in combination with the relevant polar coordinates taken from said impulse generator (20).

\* \* \* \* \*